US012798020B2

(12) United States Patent
Huang et al.

(10) Patent No.: US 12,798,020 B2
(45) Date of Patent: Nov. 17, 2026

(54) WELDING POSITIONING CLAMP

(71) Applicant: CONTEMPORARY AMPEREX TECHNOLOGY (HONG KONG) LIMITED, Hong Kong (CN)

(72) Inventors: Chaoqun Huang, Ningde (CN); Lei Song, Ningde (CN); Shengdong Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 677 days.

(21) Appl. No.: 18/221,908

(22) Filed: Jul. 14, 2023

(65) Prior Publication Data

US 2024/0253168 A1 Aug. 1, 2024

Related U.S. Application Data

(63) Continuation of application No. PCT/CN2023/084449, filed on Mar. 28, 2023.

(30) Foreign Application Priority Data

Jan. 30, 2023 (CN) ......................... 202320085543.2

(51) Int. Cl.
*B23K 37/04* (2006.01)
*B23K 26/70* (2014.01)
*H01M 50/169* (2021.01)

(52) U.S. Cl.
CPC ........ *B23K 37/0435* (2013.01); *B23K 26/702* (2015.10); *H01M 50/169* (2021.01); *Y02E 60/10* (2013.01)

(58) Field of Classification Search
None
See application file for complete search history.

(56) References Cited

U.S. PATENT DOCUMENTS

2025/0214182 A1* 7/2025 Meng ..................... B23K 37/04

FOREIGN PATENT DOCUMENTS

CN 207043563 U 2/2018
CN 207930224 U 10/2018

(Continued)

OTHER PUBLICATIONS

CN 207930224 U (Su, Zhou et al.) Oct. 2, 2018 [retrieved on Mar. 17, 2026]. Retrieved from Foreign Image and Text database, translation by Clarivate Analytics. (Year: 2018).*

(Continued)

*Primary Examiner* — John J Norton
(74) *Attorney, Agent, or Firm* — XSENSUS LLP

(57) ABSTRACT

A welding positioning clamp includes a first lateral press, a base, an installation plate, and a positioning structure. The first lateral press may be provided on the installation plate, and the positioning structure may be configured to position a workpiece along a third direction. The first lateral press may include a first lateral pressing block and a first reference block that may be provided on a reference side, and a second lateral pressing block provided on a movable side. Both the second lateral pressing block and the first lateral pressing block may be capable of moving along a first direction, and the first reference block may be at a fixed position along the first direction.

8 Claims, 2 Drawing Sheets

(56) References Cited

FOREIGN PATENT DOCUMENTS

| | | | | | |
|---|---|---|---|---|---|
| CN | 110814609 | A | | 2/2020 | |
| CN | 111390467 | A | * | 7/2020 | ........... B23K 26/702 |
| CN | 212217562 | U | | 12/2020 | |
| CN | 214978622 | U | | 12/2021 | |
| CN | 215731834 | U | | 2/2022 | |
| CN | 216903146 | U | | 7/2022 | |
| JP | 2020171930 | A | * | 10/2020 | |
| KR | 100846840 | B1 | | 7/2008 | |

OTHER PUBLICATIONS

CN 215731834 U (Xiao, Tian-bao et al.) Feb. 1, 2022 [retrieved on Mar. 17, 2026]. Retrieved from Foreign Image and Text database, translation by Clarivate Analytics. (Year: 2022).*

CN 216903146 U (Bai, Guo-jian et al.) Jul. 5, 2022 [retrieved on Mar. 17, 2026]. Retrieved from Foreign Image and Text database, translation by Clarivate Analytics. (Year: 2022).*

Notification to Grant Patent Right dared Feb. 27, 2023 in Chinese Patent Application No. 202320085543.2 with English translation thereof, 2 pages.

International Search Report issued Sep. 19, 2023 in International Patent Application No. PCT/CN2023/084449 with English translation thereof, 10 pages.

Written Opinion issued Sep. 19, 2023 in International Patent Application No. PCT/CN2023/084449 with English translation thereof, 10 pages.

* cited by examiner

WELDING POSITIONING CLAMP

CROSS-REFERENCE TO RELATED APPLICATIONS

This application is a continuation of International Application No. PCT/CN2023/084449, filed Mar. 28, 2023, which refers to Chinese Patent Application No. 202320085543.2, filed on Jan. 30, 2023 and entitled "WELDING POSITIONING CLAMP", each of which is incorporated herein by reference in its entirety.

TECHNICAL FIELD

This application relates to the field of traction battery technologies, and more specifically, to a welding positioning clamp.

BACKGROUND

With popularization and promotion of new energy vehicles, safety and reliability of new energy vehicles are attracting increasing attention. A traction battery is a rechargeable battery and a power source of the new energy vehicle, and is widely used in the field of new energy vehicles.

Currently, a traction battery includes a battery cell and a box. The box includes a first part and a second part that are engaged with each other. The second part and the first part are welded and fixed to form a box with an accommodating cavity, and the battery cell is placed in the accommodating cavity. The first part and second part of the box need to be positioned to ensure that a gap between the first part and the second part is within a preset range. However, if effective positioning cannot be implemented because a pressing block in an existing positioning clamp is worn out, the gap (that is, a welding joint) between the first part and the second part exceeds the preset range, and laser leaks from the gap, causing damage to the battery cell.

SUMMARY

In view of this, this application discloses a welding positioning clamp.

A welding positioning clamp includes: a first lateral pressing apparatus or press, where the first lateral pressing apparatus is configured to position a workpiece along a first direction, and the first direction is a thickness direction of the workpiece; a base and an installation plate, where the installation plate is movably provided at the base along a second direction perpendicular to the first direction, and the first lateral pressing apparatus is provided on the installation plate: and a positioning apparatus or structure, where the positioning apparatus is configured to position the workpiece along a third direction, the third direction is perpendicular to the first direction and the second direction separately, and the positioning apparatus is slidably provided on the installation plate along the first direction and covers a top of the first lateral pressing apparatus, where the first lateral pressing apparatus has a movable side and a reference side that are opposite each other along the first direction: and the first lateral pressing apparatus includes a first lateral pressing block and a first reference block that are provided at the reference side, and a second lateral pressing block provided at the movable side, both the second lateral pressing block and the first lateral pressing block are capable of moving along the first direction, and the first reference block is at a fixed position along the first direction. In the foregoing welding positioning clamp, a first reference block and a first lateral pressing block are provided on the reference side of the first lateral pressing apparatus. The first reference block is at a fixed position and used as a positioning reference, and the first lateral pressing block can move along the first direction. Even if one of the first reference block or the first lateral pressing block is worn out, the reference side and the movable side of the first lateral pressing apparatus can still fit to press the workpiece tightly, thereby reducing the risk of laser leakage from a gap when the workpiece is not pressed tightly.

In an embodiment, at least two first reference blocks are provided on the reference side along the second direction, and at least one first lateral pressing block is provided between the two outermost first reference blocks along the second direction. In this way, at least two first reference blocks are provided on the reference side along the second direction, and at least one first lateral pressing block is provided between the two outermost first reference blocks along the second direction. When either of the first reference block and the first lateral pressing block is worn out, the reference side of the first lateral pressing apparatus can still press the workpiece tightly, thereby reducing positioning deviation of the workpiece that is caused because the first reference block is worn out.

In an embodiment, at least two first lateral pressing blocks are provided between the outermost first reference blocks along the second direction. The first lateral pressing apparatus further includes a first drive member or driver corresponding to the first lateral pressing block, and the first drive member is configured to drive the first lateral pressing block to move along the first direction. In this way, at least two first lateral pressing blocks are provided between the two outermost first reference blocks along the second direction, and the first drive member is provided corresponding to the first lateral pressing block. A position of each first lateral pressing block can be independently controlled and adjusted, thereby reducing positioning deviation of the reference side that is caused because a single first lateral pressing block is worn out.

In an embodiment, at least two second lateral pressing blocks are provided on the movable side along the second direction. The first lateral pressing apparatus further includes a second drive member or driver corresponding to the second lateral pressing block, and the second drive member is configured to drive the second lateral pressing block to move along the first direction. In this way, at least two second lateral pressing blocks are provided on the movable side along the second direction, and the second drive member is provided corresponding to the second lateral pressing block. A position of each second lateral pressing block can be independently controlled and adjusted to reduce the risk that positioning of the movable side deviates because one second lateral pressing block is worn out.

In an embodiment, a drive force of the second drive member is smaller than that of the first drive member. In this way, when both the first lateral pressing block and the second lateral pressing block press the workpiece tightly, the drive force of the second drive member is smaller than that of the first drive member, which can effectively ensure that the first lateral pressing block pushes the workpiece toward the first reference block on the same side as the first lateral pressing block and presses the workpiece tightly.

In an embodiment, the welding positioning clamp further includes a controller and a detection apparatus or detector that are electrically connected, the detection apparatus is provided on the second lateral pressing block and configured to detect an actual displacement of the second lateral pressing block, and based on a difference between an actual displacement and a preset displacement, the controller controls the detection apparatus to send or skip sending a warning signal. In this way, the detection apparatus can detect the actual displacement of the second lateral pressing block, and based on the difference between the actual displacement and the preset displacement, the controller controls the detection apparatus to send or skip sending a warning signal, to effectively determine whether the second lateral pressing block is worn out, thereby further reducing the risk that the position of the workpiece deviates because the second lateral pressing block is worn out to a great extent.

In an embodiment, the welding positioning clamp further includes a second lateral pressing apparatus or press, and the second lateral pressing apparatus is configured to position the workpiece along the second direction. In this way, the workpiece can be positioned along both the first direction and the second direction, which is conducive to improvement of reliability and accuracy of positioning.

In an embodiment, the second lateral pressing apparatus includes a second reference block and a third lateral pressing block that are opposite each other along the second direction, the third lateral pressing block is capable of moving along the second direction, and the second reference block is at a fixed position along the second direction. In this way, the second reference block is at a fixed position and used as a positioning reference, and the third lateral pressing block can move along the second direction. The third lateral pressing block fits the second reference block to effectively press the workpiece tightly.

In an embodiment, the welding positioning clamp further includes a lifting apparatus or lifter, and the lifting apparatus is configured to drive the workpiece to move along the third direction. In this way, the lifting apparatus is configured to drive the workpiece to move along the third direction, so that the position of the workpiece is adjusted along the third direction.

REFERENCE SIGNS

Figure 1:
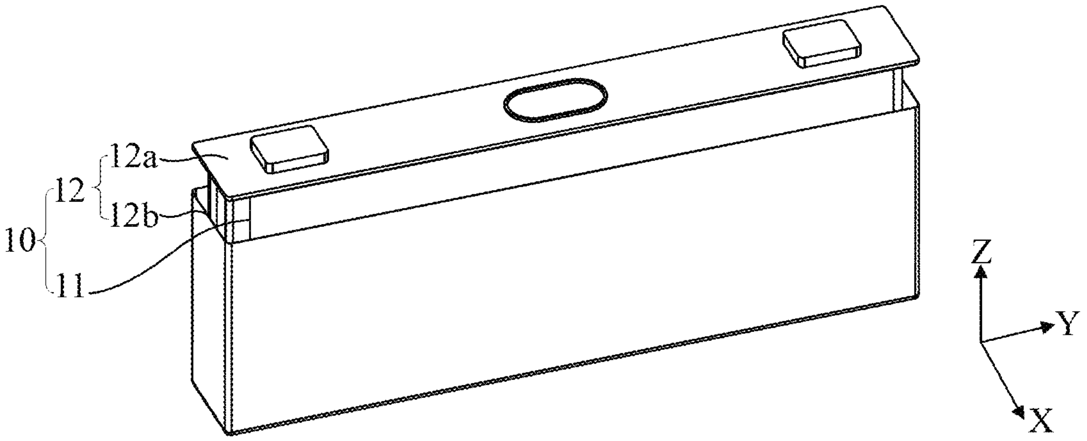
FIG. 1 is a schematic diagram of a workpiece according to an embodiment.

10. workpiece; 11. battery cell; 12. box; 12*a*. first part; 12*b*. second part; 100. first lateral pressing apparatus; 101. movable side; 102. reference side; 110. first lateral pressing block; 120. first reference block; 130. second lateral pressing block; 140. first drive member; 150. second drive member; 200. detection apparatus; 300. second lateral pressing apparatus; 310. second reference block; 320. third lateral pressing block; 400. positioning apparatus; 500. base; 600. installation plate; and 601. positioning groove.

DESCRIPTION OF EMBODIMENTS

To make the objectives, features and advantages of this application more comprehensible, the following further describes specific embodiments of this application in detail with reference to the accompanying drawings. In the following descriptions, numerous specific details are set forth in order to provide a thorough understanding of this application. However, this application may be implemented in many other ways different from those described herein, and a person skilled in the art can make similar improvements without violating the connotation of this application. Therefore, this application is not restricted by the specific embodiments disclosed below:

In the descriptions of this application, it should be understood that the orientations or positional relationships indicated by the terms “center”, “vertical”, “transverse”, “length”, “width”, “thickness”, “upper”, “lower”, “front”, “rear”, “left”, “right”, “perpendicular”, “horizontal”, “top”, “bottom”, “inside”, “outside”, “clockwise”, “counterclockwise”, “axial”, “radial”, “circumferential”, and the like are based on the orientations or positional relationships shown in the accompanying drawings, are merely intended to facilitate the descriptions of this application and simplify the descriptions, are not intended to indicate or imply that the apparatuses or components mentioned in this application must have specific orientations, or be constructed and operated for a specific orientation, and therefore shall not be construed as a limitation on this application.

In addition, the terms “first” and “second” are merely intended for a purpose of description, and shall not be understood as an indication or implication of relative importance or implicit indication of a quantity of indicated technical features. Therefore, a feature defined by “first” or “second” may explicitly or implicitly include at least one such feature. In the description of this application, the meaning of “a plurality of” is at least two, for example two, three, or the like, unless otherwise specifically defined.

In this application, unless otherwise specified and defined explicitly, the terms “mount”, “connect”, “join”, and “fasten” should be understood in their general senses. For example, they may refer to a fixed connection, a detachable connection, or an integral connection, may refer to a mechanical connection or an electrical connection, any may refer to a direct connection, an indirect connection via an intermediate medium, or an interaction between two elements, unless otherwise defined explicitly. A person of ordinary skills in the art can understand specific meanings of these terms in this application as appropriate to specific situations.

In this application, unless otherwise clearly specified and limited, a first feature being “on” or “under” a second feature may mean that the first and second features are in direct contact, or the first and second features are in indirect contact through an intermediary. Further, the first feature being “on”, “above”, or “on top of” the second feature may mean that the first feature is directly above or obliquely above the second feature, or simply mean that the first feature is horizontally higher than the second feature. The first feature being “under”, “below”, or “beneath” the second feature may mean that the first feature is directly beneath or obliquely beneath the second feature, or simply mean that the first feature is horizontally lower than the second feature.

It should be noted that when an element is referred to as being “fixed to” or “provided at” another element, it may be directly on the another element, or there may be an in-between element. When an element is deemed as being “connected to” another element, it may be directly connected to the another element, or there may be an in-between element. The terms “vertical”, “horizontal”, “upper”, "lower", "left", "right", and other similar expressions as used herein are for illustration only, and do not indicate this embodiment is exclusive.

With popularization and promotion of new energy vehicles, safety and reliability of new energy vehicles are attracting increasing attention. A traction battery is a rechargeable battery and a power source of the new energy vehicle, and is widely used in the field of new energy vehicles.

Currently, a traction battery includes a battery cell and a box. The box includes a first part and a second part that are engaged with each other. The second part and the first part are welded and fixed to form a box with an accommodating cavity, and the battery cell is placed in the accommodating cavity. The first part and the second part of the box need to be positioned to ensure that a gap between the first part and the second part is within a preset range. However, if effective positioning cannot be implemented because a pressing block in an existing positioning clamp is worn out, the gap (that is, a welding joint) between the first part and the second part exceeds the preset range, and laser leaks from the gap, causing damage to the battery cell.

Based on the foregoing considerations, the inventor has designed a welding positioning clamp through in-depth research. A first reference block 120 and a first lateral pressing block 110 are provided on the reference side 102 of the first lateral pressing apparatus 100. The first reference block 120 is at a fixed position and used as a positioning reference, and the first lateral pressing block 110 is capable of moving along the first direction. Even if one of the first reference block 120 or the first lateral pressing block 110 is worn out, the reference side 102 and the movable side 101 of the first lateral pressing apparatus 100 can still fit to press the workpiece 10 tightly, thereby reducing the risk of laser leakage from a gap when the workpiece 10 is not pressed tightly.

Figure 2:
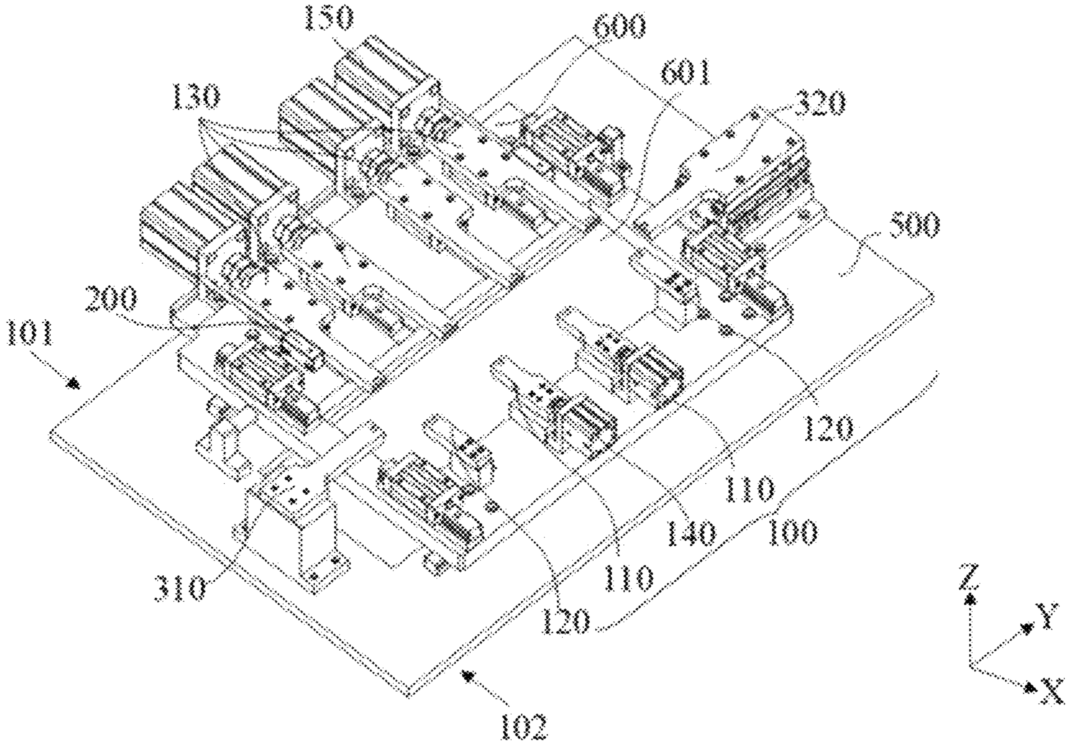
FIG. 2 is a partial schematic diagram of a welding positioning clamp according to an embodiment.

Referring to FIG. 1 and FIG. 2, in an embodiment, the welding positioning clamp includes a first lateral pressing apparatus 100, a base 500, an installation plate 600, and a positioning apparatus 400. The first lateral pressing apparatus 100 is configured to position the workpiece 10 along the first direction, the first direction is a thickness direction of the workpiece 10, the installation plate 600 is movably provided at the base 500 along the second direction perpendicular to the first direction, and the first lateral pressing apparatus 100 is provided on the installation plate 600. The positioning apparatus 400 is configured to position the workpiece 10 along a third direction. The third direction is perpendicular to the first direction and the second direction separately, and the positioning apparatus 400 is slidably provided on the installation plate 600 along the first direction and covers a top of the first lateral pressing apparatus 100. The first lateral pressing apparatus 100 has a movable side 101 and a reference side 102 that are opposite each other along the first direction, the first lateral pressing apparatus 100 includes a first lateral pressing block 110 and a first reference block 120 that are provided at the reference side 102, and a second lateral pressing block 130 provided at the movable side 101, both the second lateral pressing block 130 and the first lateral pressing block 110 are capable of moving along the first direction, and the first reference block 120 is at a fixed position along the first direction.

It should be noted that the movable side 101 and the reference side 102 of the first lateral pressing apparatus 100 press two sides of the workpiece 10 respectively. As shown in FIG. 2, before the workpiece 10 is effectively positioned along the first direction (direction X shown in FIG. 1), the workpiece 10 is moved to reach a preset height, then the second lateral pressing block 130 is moved along the first direction, and the workpiece 10 is pushed to the first reference block 120. The second lateral pressing block 130 is stopped from moving when the workpiece 10 abuts against the first reference block 120, and then the first lateral pressing block 110 is moved along the first direction, and stopped from moving when the first lateral pressing block 110 abuts against the workpiece 10, so that both the movable side 101 and the reference side 102 of the first lateral pressing apparatus 100 press the workpiece 10 tightly.

In this case, the second direction is a direction Y shown in FIG. 2, that is, a length direction of the workpiece 10. The third direction is a direction Z shown in FIG. 1, and the third direction is a height direction of the workpiece 10. Before the workpiece 10 is effectively positioned along the third direction (direction Z shown in FIG. 3), the workpiece 10 first moves along the third direction until the workpiece 10 abuts against the positioning apparatus 400, so that after the workpiece 10 is positioned in the height direction, the workpiece 10 is positioned along the first direction and the second direction.

In this embodiment of this application, the positioning apparatus 400 is a positioning plate, and the positioning plate is a rectangular plate to match the workpiece 10. In other embodiments, the positioning plate may also have another shape. In this embodiment of this application, the installation plate 600 is provided with a sliding rail and a sliding block provided on the sliding rail, and the positioning apparatus 400 is fixed to the sliding rail so that the positioning apparatus 400 can slide relative to the installation plate 600.

In this embodiment of this application, the workpiece 10 is a prismatic battery. As shown in FIG. 1, the prismatic battery includes a battery cell 11 and a box 12 configured to accommodate the battery cell 11. The box 12 includes a first part **12*a* and a second part 12*b*, the first part 12*a* is a hollow structure with an open side and the second part 12*b* is a plate-like structure, and the second part 12*b* is engaged with the open side of the first part 12*a* to form a box 12 with an accommodating cavity. After the box 12 is positioned by using the foregoing welding positioning clamp, the first part 12*a* and the second part 12*b* are fixed by laser welding, and during welding, it needs to be ensured that a gap (that is, a welding joint) between the first part 12*a* and the second part 12*b* is within a preset range to reduce a risk of damaging the battery cell 11** because laser leakage occurs at the gap.

In this embodiment of this application, the first lateral pressing apparatus 100 is configured as a structure for pressing the workpiece 10 tightly along the thickness direction of the workpiece 10. The first lateral pressing block 110, the first reference block 120, and the second lateral pressing block 130 in the first lateral pressing apparatus 100 may be cylindrical or prismatic or have another shape, and quantities of the first lateral pressing blocks 110, the first reference blocks 120, and the second lateral pressing blocks 130 are not limited to one. In this case, the shapes and the quantities of the first lateral pressing blocks 110, the first reference blocks 120, and the second lateral pressing blocks 130 are not specifically limited.

In the foregoing welding positioning clamp, a first reference block 120 and a first lateral pressing block 110 are provided on the reference side 102 of the first lateral pressing apparatus 100. The first reference block 120 is at a fixed position and used as a positioning reference, and the first lateral pressing block 110 is capable of moving along the first direction. Even if one of the first reference block 120 or the first lateral pressing block 110 is worn out, the reference side 102 and the movable side 101 of the first lateral pressing apparatus 100 can still fit to press the workpiece 10 tightly, thereby reducing the risk of laser leakage from a gap when the workpiece 10 is not pressed tightly.

According to some embodiments of this application, referring to FIG. 2, at least two first reference blocks 120 are provided on the reference side 102 along the second direction perpendicular to the first direction, and at least one first lateral pressing block 110 is provided between the two outermost first reference blocks 120 along the second direction.

In this embodiment of this application, the first lateral pressing block 110 and all the first reference blocks 120 are provided side by side and equally spaced apart along the second direction. For example, as shown in FIG. 1, two first reference blocks 120 and two first lateral pressing blocks 110 are provided on the reference side 102 along the second direction. The two first reference blocks 120 are located at the outermost positions in the second direction, and the two first lateral pressing blocks 110 are provided between the two first reference blocks 120. The two first reference blocks 120 and the two first lateral pressing blocks 110 are provided side by side and equally spaced apart along the second direction. In other embodiments, the first lateral pressing block 110 and all the first reference blocks 120 may alternatively be provided side by side and unequally spaced apart along the second direction.

With the foregoing setting, at least two first reference blocks 120 are provided on the reference side 102 along the second direction, and at least one first lateral pressing block 110 is provided between the two outermost first reference blocks 120 along the second direction. When either of the first reference blocks 120 and the first lateral pressing block 110 is worn out, the reference side 102 of the first lateral pressing apparatus 100 can still press the workpiece 10 tightly, thereby reducing positioning deviation of the workpiece 10 that is caused because the first reference block 120 is worn out.

According to some embodiments of this application, referring to FIG. 2, at least two first lateral pressing blocks 110 are provided between the two outermost first reference blocks 120 along the second direction, and the first lateral pressing apparatus 100 further includes a first drive member 140 provided corresponding to the first lateral pressing block 110, and the first drive member 140 is configured to drive the first lateral pressing block 110 to move along the first direction.

In this embodiment of this application, the first drive member 140 is a cylinder, and the first drive member 140 can drive the first lateral pressing block 110 to move translationally to adjust the position of the first lateral pressing block 110 along the first direction.

In this embodiment of this application, all the first lateral pressing blocks 110 are provided side by side and equally spaced apart along the second direction. For example, as shown in FIG. 1, two first reference blocks 120 and two first lateral pressing blocks 110 are provided on the reference side 102 along the second direction. The two first reference blocks 120 are located at the outermost positions in the second direction, and the two first lateral pressing blocks 110 are provided between the two first reference blocks 120. The two first reference blocks 120 and the two first lateral pressing blocks 110 are provided side by side and equally spaced apart along the second direction. In other embodiments, all the first lateral pressing blocks 110 may alternatively be provided side by side and unequally spaced apart along the second direction.

With the foregoing setting, at least two first lateral pressing blocks 110 are provided between the two outermost first reference blocks 120 along the second direction, and the first drive member 140 is provided corresponding to the first lateral pressing blocks 110. A position of each first lateral pressing block 110 can be independently controlled and adjusted, thereby reducing positioning deviation of the reference side 102 that is caused because a single first lateral pressing block 110 is worn out.

According to some embodiments of this application, referring to FIG. 2, at least two second lateral pressing blocks 130 are provided on the movable side 101 along the second direction, the first lateral pressing apparatus 100 further includes a second drive member 150 provided corresponding to the second lateral pressing block 130, and the second drive member 150 is configured to drive the second lateral pressing block 130 to move along the first direction.

In this embodiment of this application, the second drive member 150 is a cylinder, and the second drive member 150 can drive the second lateral pressing block 130 to move translationally to adjust the position of the second lateral pressing block 130 along the first direction.

In this embodiment of this application, all the second lateral pressing blocks 130 are provided side by side and equally spaced apart along the second direction. In other embodiments, all the second lateral pressing blocks may alternatively be provided side by side and unequally spaced apart along the second direction.

With the foregoing setting, at least two second lateral pressing blocks 130 are provided on the movable side 101 along the second direction, and the second drive member 150 is provided corresponding to the second lateral pressing block 130, and the position of each second lateral pressing block 130 can be independently controlled and adjusted to reduce the risk that positioning of the movable side 101 deviates because single second lateral pressing block 130 is worn out.

According to some embodiments of this application, referring to FIG. 2, a drive force of the second drive member 150 is smaller than that of the first drive member 140.

In this embodiment of this application, both the first drive member 140 and the second drive member 150 are cylinders. A cylinder bore of the second drive member 150 is smaller than that of the first drive member 140 so that the drive force of the second drive member 150 is smaller than that of the first drive member 140.

It can be understood that the second lateral pressing block 130 and the first lateral pressing block 110 press the workpiece 10 on different sides of the workpiece 10. The second drive member 150 is configured to drive the second lateral pressing block 130 to move along the first direction, and the first drive member 140 is configured to drive the first lateral pressing block 110 to move along the first direction.

With the foregoing setting, when both the first lateral pressing block 110 and the second lateral pressing block 130 press the workpiece 10 tightly, the drive force of the second drive member 150 is smaller than that of the first drive member 140, which can effectively ensure that the first lateral pressing block 110 pushes the workpiece 10 toward the first reference block 120 on the same side as the first lateral pressing block 110 and presses the workpiece 10 tightly.

According to some embodiments of this application, referring to FIG. 2, the welding positioning clamp further includes a controller and a detection apparatus 200 that are electrically connected, the detection apparatus 200 is provided on the second lateral pressing block 130 and configured to detect an actual displacement of the second lateral pressing block 130, and based on a difference between the actual displacement and a preset displacement, the controller controls the detection apparatus 200 to send or skip sending a warning signal.

It can be understood that when the second lateral pressing block 130 presses the workpiece 10, the detection apparatus 200 detects the actual displacement of the second lateral pressing block 130 and generates a corresponding displacement signal. The controller receives the displacement signal and compares the actual displacement with the preset displacement. When the difference between the actual displacement and the preset displacement is relatively large, this indicates that the second lateral pressing block 130 is worn out to a great extent, which causes a deviation of a pressing position of the workpiece 10. In this case, the controller controls the detection apparatus 200 to send a warning signal.

Specifically, in this embodiment, the detection apparatus 200 includes a magnetic scale and a reading head. The magnetic scale is fixed to the second lateral pressing block 130, the magnetic scale moves along with the second lateral pressing block 130, the reading head is configured to obtain position information of the magnetic scale and generate a displacement signal, and the controller is configured to receive the displacement signal output by the reading head and determine whether the detection apparatus 200 needs to send a warning signal. In other embodiments, the detection apparatus 200 may further be a photoelectric detector or another element or structure that can measure a distance.

In this embodiment of this application, a quantity of the detection apparatuses 200 is not limited to one, that is, the quantity of the detection apparatuses 200 may be at least two. For example, as shown in FIG. 1, four second lateral pressing blocks 130 are provided side by side and equally spaced apart along the second direction, and the two outermost first lateral pressing blocks 110 along the second direction each are provided with one detection apparatus 200 correspondingly, to determine whether the foregoing two first lateral pressing blocks 110 are worn out.

With the foregoing setting, the detection apparatus 200 can detect the actual displacement of the second lateral pressing block 130, and based on the difference between the actual displacement and the preset displacement, the controller controls the detection apparatus 200 to send or skip sending a warning signal, to effectively determine whether the second lateral pressing block 130 is worn out, thereby further reducing the risk that the position of the workpiece 10 deviates because the second lateral pressing block 130 is worn out to a great extent.

According to some embodiments of this application, referring to FIG. 2, the welding positioning clamp further includes a second lateral pressing apparatus 300, and the second lateral pressing apparatus 300 is configured to position the workpiece 10 along the second direction.

With the foregoing setting, the workpiece 10 can be positioned along both the first direction and the second direction, which is conducive to improvement of reliability and accuracy of positioning.

According to some embodiments of this application, referring to FIG. 2, the second lateral pressing apparatus 300 includes a second reference block 310 and a third lateral pressing block 320 that are opposite each other along the second direction, the third lateral pressing block 320 is capable of moving along the second direction, and the second reference block 310 is at a fixed position along the second direction.

In this embodiment of this application, the second lateral pressing apparatus 300 further includes a third drive member connected to the third lateral pressing block 320, and the third drive member is configured to drive the third lateral pressing block 320 to move along the second direction. Optionally, the third drive member is a cylinder.

In this embodiment of this application, quantities of the second reference blocks 310 and the third lateral pressing blocks 320 are not limited to one, that is, the quantities of both the second reference blocks 310 and the third lateral pressing blocks 320 may alternatively be at least two to increase positioning points along the second direction.

It should be noted that after the workpiece 10 is positioned along the first direction, the third lateral pressing block 320 moves along the second direction and pushes the workpiece 10 to move to and abut against the second reference block 310 so that the workpiece 10 is positioned along the second direction.

With the foregoing setting, the second reference block 310 is at a fixed position and used as a positioning reference, and the third lateral pressing block 320 can move along the second direction. The third lateral pressing block 320 fits the second reference block 310 to effectively press the workpiece 10 tightly.

Figure 3:
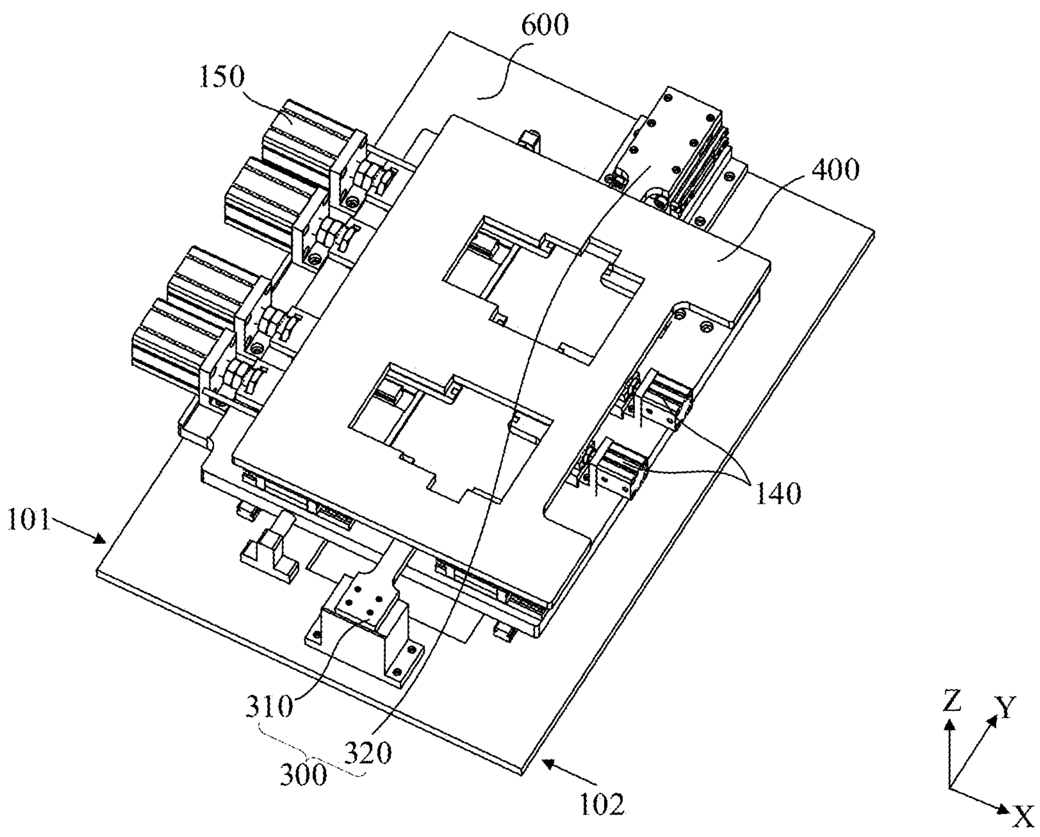
FIG. 3 is a schematic diagram of a welding positioning clamp according to an embodiment.

According to some embodiments of this application, referring to FIG. 2 and FIG. 3, the welding positioning clamp further includes a lifting apparatus, and the lifting apparatus is configured to drive the workpiece 10 to move along the third direction.

It can be understood that both the base 500 and the installation plate 600 are provided with a positioning groove 601 for positioning the workpiece 10, and the workpiece 10 is fed into the positioning groove 601 from the bottom to the top, so that the workpiece 10 moves along the third direction until the workpiece abuts against the positioning apparatus 400, and then the second lateral pressing block 130 moves along the first direction and pushes the workpiece 10 to the first reference block 120, and the second lateral pressing block 130 stops moving when the workpiece 10 abuts against the first reference block 120, and then the first lateral pressing block 110 moves along the first direction, and stops moving when the first lateral pressing block 110 abuts against the workpiece 10, so that both the movable side 101 and the reference side 102 of the first lateral pressing apparatus 100 press the workpiece 10 along the first direction tightly: The third lateral pressing block 320 moves along the second direction and pushes the workpiece 10 to move until the workpiece 10 abuts against the second reference block 310, so that the workpiece 10 is positioned along the second direction.

With the foregoing setting, the lifting apparatus is configured to drive the workpiece 10 to move along the third direction, so that the position of the workpiece 10 is adjusted along the third direction.

According to some embodiments of this application, referring to FIG. 1 to FIG. 3, this application provides a welding positioning clamp. The welding positioning clamp includes a first lateral pressing apparatus 100, a controller, a detection apparatus 200, a second lateral pressing apparatus 300, a positioning apparatus 400, a base 500, an installation plate 600, and a lifting apparatus. The first lateral pressing apparatus 100 is configured to position the workpiece 10 along the first direction, the first direction is a thickness direction of the workpiece 10, and the second lateral pressing apparatus 300 is configured to position the workpiece 10 along the second direction.

The first lateral pressing apparatus 100 includes a first lateral pressing block 110, a first reference block 120, a second lateral pressing block 130, a first drive member 140, and a second drive member 150. The first lateral pressing apparatus 100 has a movable side 101 and a reference side 102 that are opposite each other along the first direction. At least two first reference blocks 120 are provided on the reference side 102 along the second direction perpendicular to the first direction, and at least two first lateral pressing blocks 110 are provided between the two outermost first reference blocks 120 along the second direction. The first drive member 140 is configured to drive the first lateral pressing block 110 to move along the first direction. At least two second lateral pressing blocks 130 are provided on the movable side 101 along the second direction, and the second drive member 150 is configured to drive the second lateral pressing block 130 to move along the first direction. The second lateral pressing block 130 and the first lateral pressing block 110 are capable of moving along the first direction, the first reference block 120 is at a fixed position along the first direction, and the drive force of the second drive member 150 is smaller than that of the first drive member 140. The second lateral pressing apparatus 300 includes a second reference block 310 and a third lateral pressing block 320 that are opposite each other along the second direction. The third lateral pressing block 320 is capable of moving along the second direction, and the second reference block 310 is at a fixed position along the second direction. The positioning apparatus 400 is configured to position the workpiece 10 along the third direction, the third direction is perpendicular to the first direction and the second direction separately, and the lifting apparatus is configured to drive the workpiece 10 to move along the third direction.

Technical features in the foregoing embodiments may be combined in any way. For brevity of description, possible combinations of the technical features in the foregoing embodiments are not described all. However, as long as there is no contradiction among combinations of these technical features, all the combinations should be considered within a range recorded in this specification.

The foregoing embodiments only represent several implementations of this application, and descriptions thereof are specific and detailed, but should not be construed as a limitation on the scope of this application. It should be noted that a person of ordinary skill in the art may further make several modifications and improvements without departing from the concept of this application, and all these modifications and improvements fall within the protection scope of this application. Therefore, the protection scope of this application should be subject to the appended claims.

The invention claimed is:

1. A welding positioning clamp, characterized by comprising:

a first lateral press to position a workpiece along a first direction, wherein the first direction is a thickness direction of the workpiece;

a base and an installation plate, wherein the installation plate is movably provided at the base along a second direction perpendicular to the first direction, and the first lateral press is provided on the installation plate; and a positioning structure to position the workpiece along a third direction, wherein the third direction is perpendicular to the first direction and the second direction separately, and the positioning structure is slidably provided on the installation plate along the first direction and covers a top of the first lateral press;

wherein the first lateral press has a movable side and a reference side that are opposite each other along the first direction, the first lateral press comprises a first lateral pressing block and a first reference block that are provided at the reference side, and a second lateral pressing block provided at the movable side, both the second lateral pressing block and the first lateral pressing block are capable of moving along the first direction, and the first reference block is at a fixed position along the first direction, and the welding positioning clamp further comprises a controller and a detector that are electrically connected, the detector is provided on the second lateral pressing block and configured to detect an actual displacement of the second lateral pressing block, and based on a difference between the actual displacement and a preset displacement, the controller controls the detector to send or skip sending a warning signal.

2. The welding positioning clamp according to claim 1, characterized in that at least two first reference blocks are provided on the reference side along the second direction, and at least one first lateral pressing block is provided between two outermost first reference blocks along the second direction.

3. The welding positioning clamp according to claim 2, characterized in that at least two first lateral pressing blocks are provided between the two outermost first reference blocks along the second direction, the first lateral press further comprises a first driver provided corresponding to the first lateral pressing block, and the first driver is configured to drive the first lateral pressing block to move along the first direction.

4. The welding positioning clamp according to claim 3, characterized in that at least two second lateral pressing blocks are provided on the movable side along the second direction, the first lateral press further comprises a second driver provided corresponding to each of the at least two second lateral pressing blocks, and the second driver is configured to drive the each of the at least two second lateral pressing blocks to move along the first direction.

5. The welding positioning clamp according to claim 4, characterized in that a drive force of the second driver is smaller than that of the first driver.

6. The welding positioning clamp according to claim 2, characterized in that the welding positioning clamp further comprises a second lateral press to position the workpiece along the second direction.

7. The welding positioning clamp according to claim 6, characterized in that the second lateral press comprises a second reference block and a third lateral pressing block that are opposite each other along the second direction, the third lateral pressing block is capable of moving along the second direction, and the second reference block is at a fixed position along the second direction.

8. The welding positioning clamp according to claim 1, characterized in that the welding positioning clamp further comprises a lifter to drive the workpiece to move along the third direction.

* * * * *